US010368058B2

(12) United States Patent
Shu et al.

(10) Patent No.: US 10,368,058 B2
(45) Date of Patent: Jul. 30, 2019

(54) METHOD AND APPARATUS FOR EXTENDING BINOCULAR CAMERA POSITIONING RANGE

(71) Applicant: Beijing Pico Technology Co., Ltd., Beijing (CN)

(72) Inventors: Yulong Shu, Beijing (CN); Jinbo Ma, Beijing (CN); Yucai Han, Beijing (CN)

(73) Assignee: Beijing Pico Technology Co., Ltd., Beijing (CN)

( * ) Notice: Subject to any disclaimer, the term of this patent is extended or adjusted under 35 U.S.C. 154(b) by 357 days.

(21) Appl. No.: 15/331,389

(22) Filed: Oct. 21, 2016

(65) Prior Publication Data

US 2018/0035100 A1 Feb. 1, 2018

(30) Foreign Application Priority Data

Aug. 1, 2016 (CN) .......................... 2016 1 0622640

(51) Int. Cl.
*H04N 5/225* (2006.01)
*H04N 5/232* (2006.01)
(Continued)

(52) U.S. Cl.
CPC ......... *H04N 13/296* (2018.05); *H04N 5/2251* (2013.01); *H04N 5/23296* (2013.01); *H04N 13/239* (2018.05); *H04N 5/2258* (2013.01)

(58) Field of Classification Search
USPC .......................................................... 348/46
See application file for complete search history.

(56) References Cited

U.S. PATENT DOCUMENTS

| 6,568,809 B2 * | 5/2003 | Trajkovic | G02B 7/102 |
| | | | 351/209 |
| 7,982,763 B2 * | 7/2011 | King | H04N 7/181 |
| | | | 348/14.01 |

(Continued)

FOREIGN PATENT DOCUMENTS

| CN | 104282020 A | 1/2015 |
| CN | 104739514 A | 7/2015 |
| CN | 105262946 A | 1/2016 |

OTHER PUBLICATIONS

Chinese Patent Office, Examination Report in Application No. 201610622640.5 dated Aug. 3, 2017.

*Primary Examiner* — Christopher S Kelley
*Assistant Examiner* — Asmamaw G Tarko
(74) *Attorney, Agent, or Firm* — LKGlobal | Lorenz & Kopf, LLP

(57) ABSTRACT

An apparatus for extending binocular camera positioning range includes: a rotatable base, a positioning module, a judging module, and a controlling module. The rotatable base is disposed on the binocular camera and drives a lens of the binocular camera to rotate. The positioning module calculates, in real time, spatial coordinates of the target to be positioned in the field of vision of the binocular camera according to an image of the target collected by the binocular camera. The judging module determines whether the target to be positioned will go out of the field of vision of the binocular camera soon according to the spatial coordinates. The controlling module may control the rotatable base to drive the lens of the binocular camera to rotate and adjust a direction of the lens of the binocular camera so that the field of vision of the binocular camera always covers the target.

10 Claims, 3 Drawing Sheets

(51) Int. Cl.
*H04N 13/296* (2018.01)
*H04N 13/239* (2018.01)

(56) References Cited

U.S. PATENT DOCUMENTS

| | | | | |
|---|---|---|---|---|
| 8,090,251 B2 * | 1/2012 | Campbell | ............... | G03B 35/00 |
| | | | | 396/89 |
| 2005/0185945 A1 * | 8/2005 | Zhang | .................... | B25J 9/1697 |
| | | | | 396/73 |
| 2007/0235648 A1 * | 10/2007 | Teich | ............... | G08B 13/19641 |
| | | | | 250/330 |
| 2011/0007154 A1 | 1/2011 | Vogel et al. | | |

* cited by examiner

METHOD AND APPARATUS FOR EXTENDING BINOCULAR CAMERA POSITIONING RANGE

CROSS-REFERENCE TO RELATED APPLICATION

This application claims the benefit and priority of Chinese Patent Application No. 201610622640.5 filed Aug. 1, 2016. The entire disclosure of the above application is incorporated herein by reference.

TECHNICAL FIELD

The present disclosure relates to the technical field of binocular 3D vision, and particularly to a method and apparatus for extending binocular camera positioning range.

BACKGROUND

Binocular 3D vision involves simulating human vision principles, observing an object from two or more points, acquiring images at different view angles, and calculating the deviation between pixels by triangulation measurement principle according to the matching relationship of the pixels between the images to obtain the 3D information of the object.

As virtual reality technologies develop, consumers constantly raise new demands for human-machine interfaces. The coordinate conversion of the real space and the virtual gaming space may be implemented by using binocular 3D vision technology to perform positioning. At present, usually a binocular camera is used to perform the positioning in a virtual reality system. The binocular camera has a fixed Field of View (FOV). The space that may be used to implement positioning is fixed. Once the user moves out of the field of vision coverage range of the binocular camera, the binocular camera cannot implement positioning, which limits the area of free movement of the user when using a virtual reality system.

Current solutions of extending binocular camera positioning range generally increases the space that may implement the positioning by increasing the FOV of the binocular camera, but the increasing FOV of the binocular camera causes problems such as larger imaging deformation, reduction of resolution and loss of positioning precision.

SUMMARY OF THE DISCLOSURE

To extend the binocular camera positioning range without increasing the FOV of the binocular camera and without losing positioning precision, the present disclosure provides a method and apparatus for extending binocular camera positioning range.

According to an aspect of the present disclosure, the present disclosure provides an apparatus for extending binocular camera positioning range, comprising: a rotatable base, a positioning module, a judging module and a controlling module;

the rotatable base is disposed on the binocular camera and configured to drive a lens of the binocular camera to rotate;

the positioning module is configured to obtain an image of a target to be positioned collected by the binocular camera according to a certain sampling frequency, and calculate, in real time, spatial coordinates of the target to be positioned in the field of vision of the binocular camera according to the collected image;

the judging module is configured to, according to the spatial coordinates of the target to be positioned calculated in real time, determine whether the target to be positioned will go out of the field of vision of the binocular camera soon; and the controlling module is configured to, when the judging module determines that the target to be positioned will go out of the field of vision of the binocular camera soon, control the rotatable base to drive the lens of the binocular camera to rotate, and adjust a direction of the lens of the binocular camera so that the field of vision of the binocular camera always covers the target to be positioned.

For example, the judging module is configured to:

determine that the target to be positioned will go out of the field of vision of the binocular camera soon when the nearest distance, as calculated in real time, between spatial coordinates of the target to be positioned in the field of vision of the binocular camera and an edge of the field of vision of the binocular camera is less than a preset distance.

For example, the judging module is configured to:

calculate a movement speed of the target to be positioned at the current moment according to spatial coordinates of several targets to be positioned nearest to the current moment and the sampling frequency of the binocular camera;

according to the movement speed and spatial coordinates of the target to be positioned at the current moment, estimate a time period that the target to be positioned spends moving at the movement speed to the edge of the field of vision of the binocular camera; and determine that the target to be positioned will go out of the field of vision of the binocular camera soon when the estimated time period is smaller than a preset time period.

Preferably, the apparatus further comprises a vertical motor and a horizontal motor individually connected with the rotatable base;

the vertical motor is capable of rotate in the vertical direction and configured to control the rotatable base to drive the lens of the binocular camera to rotate around a vertical axis; and the horizontal motor is capable of rotate in the horizontal direction and configured to control the rotatable base to drive the lens of the binocular camera to rotate around a horizontal axis.

For example, the controlling module is configured to:

when the judging module determines that the target to be positioned will go out of the field of vision of the binocular camera soon from the left or right, control the vertical motor to rotate in the vertical direction and thereby control the rotatable base to drive the lens of the binocular camera to rotate to the left or to the right around a vertical axis so that the target to be positioned is at a center of the field of vision in the horizontal direction after the lens of the binocular camera rotates; and when the judging module determines that the target to be positioned will go out of the field of vision of the binocular camera soon from above or below, control the horizontal motor to rotate in the horizontal direction and thereby control the rotatable base to drive the lens of the binocular camera to rotate upward or downward around a horizontal axis, so that the target to be positioned is at a center of the field of vision in the vertical direction after the lens of the binocular camera rotates.

According to another aspect of the present disclosure, the present disclosure provides a method for extending binocular camera positioning range, comprising:

disposing a rotatable base on a binocular camera, the rotatable base configured to drive a lens of the binocular camera to rotate.

obtaining an image of a target to be positioned collected by the binocular camera according to a certain sampling frequency, and calculating, in real time, spatial coordinates of the target to be positioned in the field of vision of the binocular camera according to the collected image;

judging whether the target to be positioned will go out of the field of vision of the binocular camera soon according to the spatial coordinates of the target to be positioned calculated in real time; and upon determining that the target to be positioned will go out of the field of vision of the binocular camera soon, controlling the rotatable base to drive the lens of the binocular camera to rotate, and adjusting a direction of the lens of the binocular camera so that the field of vision of the binocular camera always covers the target to be positioned.

Preferably, the judging whether the target to be positioned will go out of the field of vision of the binocular camera soon according to the spatial coordinates of the target to be positioned calculated in real time includes:

determining that the target to be positioned will go out of the field of vision of the binocular camera soon when the nearest distance, as calculated in real time, between spatial coordinates of the target to be positioned in the field of vision of the binocular camera and an edge of the field of vision of the binocular camera is less than a preset distance.

Preferably, the judging whether the target to be positioned will go out of the field of vision of the binocular camera soon according to the spatial coordinates of the target to be positioned calculated in real time includes:

calculating a movement speed of the target to be positioned at the current moment according to spatial coordinates of several targets to be positioned nearest to the current moment and the sampling frequency of the binocular camera;

according to the movement speed and spatial coordinates of the target to be positioned at the current moment, estimating a time period that the target to be positioned spends moving at the movement speed to the edge of the field of vision of the binocular camera; and determining that the target to be positioned will go out of the field of vision of the binocular camera soon when the estimated time period is smaller than a preset time period.

Preferably, the method further comprises:

connecting a vertical motor and a horizontal motor individually with the rotatable base; the vertical motor is capable of rotate in the vertical direction and configured to control the rotatable base to drive the lens of the binocular camera to rotate around a vertical axis; and the horizontal motor is capable of rotate in the horizontal direction and configured to control the rotatable base to drive the lens of the binocular camera to rotate around a horizontal axis.

Preferably, the upon determining that the target to be positioned will go out of the field of vision of the binocular camera soon, controlling the rotatable base to drive the lens of the binocular camera to rotate, and adjusting a direction of the lens of the binocular camera so that the field of vision of the binocular camera always covers the target to be positioned specifically comprises:

upon determining that the target to be positioned will go out of the field of vision of the binocular camera soon from the left or right, controlling the vertical motor to rotate in the vertical direction and thereby controlling the rotatable base to drive the lens of the binocular camera to rotate to the left or to the right around a vertical axis so that the target to be positioned is at a center of the field of vision in the horizontal direction after the lens of the binocular camera rotates; and upon determining that the target to be positioned will go out of the field of vision of the binocular camera soon from above or below, controlling the horizontal motor to rotate in the horizontal direction and thereby controlling the rotatable base to drive the lens of the binocular camera to rotate upward or downward around a horizontal axis, so that the target to be positioned is at a center of the field of vision in the vertical direction after the lens of the binocular camera rotates.

Advantageous effects of embodiments of the present disclosure are as follows: by disposing the rotatable base on the binocular camera, when the target to be positioned will go out of the field of vision of the binocular camera soon, the rotatable base drives the lens of the binocular camera to rotate and adjusts the direction of the lens of the binocular camera so that the field of vision of the binocular camera always covers the target to be positioned, so that the extension of the binocular camera positioning range is realized without increasing the FOV of the binocular camera and without losing positioning precision. In a further preferred embodiments, upon determining that the target to be positioned will go out of the field of vision of the binocular camera soon, the lens of the binocular camera is controlled to perform horizontal rotation and/or vertical rotation, so that the target to be positioned is at a central position of the field of vision after rotation, so that the target to be positioned obtains a larger movement space and is not apt to go out of the field of vision again, and the frequent rotation of the lens of the binocular camera is avoided.

DETAILED DESCRIPTION

The design idea of the present disclosure is as follows: using a binocular camera to track a target to be positioned in real time, adjusting a direction of the lens of the binocular camera when the target to be positioned will go out of the field of vision of the binocular camera soon, so that the field of vision of the binocular camera always covers the target to be positioned, whereby the positioning range of the binocular camera is extended without changing the original FOV of the binocular camera, and the positioning precision will not be harmed.

Embodiments of the present disclosure will be described below in further detail in conjunction with figures to make the objectives, technical solutions and advantages of the present disclosure clearer.

Figure 1:
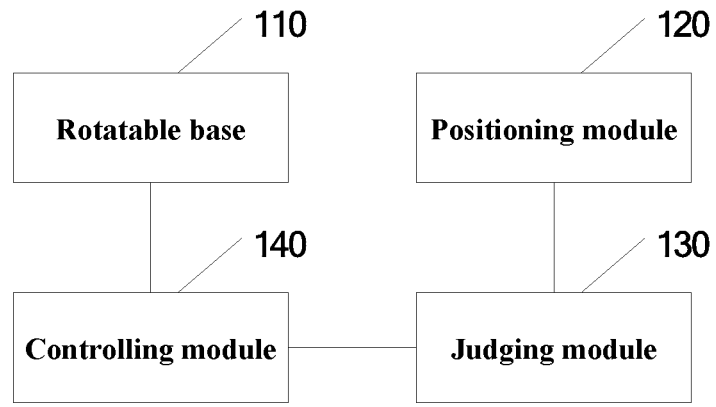
FIG. 1 is a structural schematic view of an apparatus for extending binocular camera positioning range according to an embodiment of the present disclosure.

FIG. 1 is a structural schematic view of an apparatus for extending binocular camera positioning range according to an embodiment of the present disclosure. As shown in FIG. 1, the apparatus for extending binocular camera positioning range according to an embodiment of the present disclosure comprises: a rotatable base 110, a positioning module 120, a judging module 130 and a controlling module 140.

The rotatable base 110 is disposed on the binocular camera and configured to drive a lens of the binocular camera to perform horizontal rotation and vertical rotation. The binocular camera collects an image of a target to be positioned according to a certain sampling frequency. The positioning module 120 is configured to calculate, in real time, spatial coordinates of the target to be positioned in the field of vision of the binocular camera according to the image. The judging module is configured to, according to the spatial coordinates of the target to be positioned calculated in real time, determine whether the target to be positioned will go out of the field of vision of the binocular camera soon. When the judging module determines that the target to be positioned will go out of the field of vision of the binocular camera soon, the controlling module 140 controls the rotatable base 110 to drive the lens of the binocular camera to rotate, and adjust a direction of the lens of the binocular camera so that the field of vision of the binocular camera always covers the target to be positioned, whereby the positioning range of the binocular camera is extended without changing the original FOV of the binocular camera, and the positioning precision will not be harmed.

To determine whether the target to be positioned will go out of the field of vision of the binocular camera soon, preferred embodiments of the present disclosure provide the following two solutions:

In a preferred embodiment of the present disclosure, a certain area is pre-demarcated in the field of vision of the binocular camera; when the binocular camera positions that the target to be positioned goes out of the pre-demarcated area, it is judged as going out of the field of vision soon. Specifically, an allowable nearest distance d between the target to be positioned and an edge of the field of vision of the binocular camera is pre-set; when the positioning module 120 calculates in real time that the nearest distance between spatial coordinates of the target to be positioned in the field of vision of the binocular camera and the edge of the field of vision of the binocular camera is less than the distance d, the judging module 130 determines that the target to be positioned will go out of the field of vision of the binocular camera soon.

In another preferred embodiment of the present disclosure, the movement speed and the movement trajectory of the target to be positioned is obtained according to the collected spatial coordinates of the target to be positioned, and the movement state of the target to be positioned is predicted on this basis. If it is predicted that the target to be positioned will go out of the field of vision of the binocular camera in a short time period in the movement state, it is judged as going out of the field of vision soon. Specifically, the judging module 130 obtains spatial coordinates of several targets to be positioned closest to the current moment, e.g., three coordinates closest to the current moment, and calculates the movement speed of the target to be positioned at the current moment according to the obtained coordinates and the sampling frequency of the binocular camera. According to the movement speed and spatial coordinates of the target to be positioned at the current moment, the judging module 130 estimates a time period that the target to be positioned spends moving at the movement speed to the edge of the field of vision of the binocular camera. When the estimated time period is smaller than a preset time period t, the judging module 130 determines that the target to be positioned will go out of the field of vision of the binocular camera soon.

In practical applications, the above two solutions of judging whether the target to be positioned will go out of the field of vision of the binocular camera soon may be used in combination.

To enable the rotatable base 110 to drive the lens of the binocular camera to rotate and adjust a direction of the lens of the binocular camera, the apparatus for extending binocular camera positioning range according to a preferred embodiment of the present disclosure further comprises a vertical motor and a horizontal motor individually connected with the rotatable base 110. The vertical motor is capable of rotate in the vertical direction and configured to control the rotatable base to drive the lens of the binocular camera to rotate around a vertical axis. The horizontal motor is capable of rotate in the horizontal direction and configured to control the rotatable base to drive the lens of the binocular camera to rotate around a horizontal axis.

Figure 2:
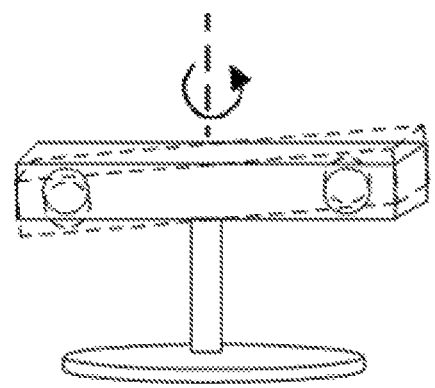
FIG. 2 is a schematic view of the apparatus for extending binocular camera positioning range according to an embodiment of the present disclosure controlling the binocular camera to rotate counterclockwise around a vertical axis.
Figure 3:
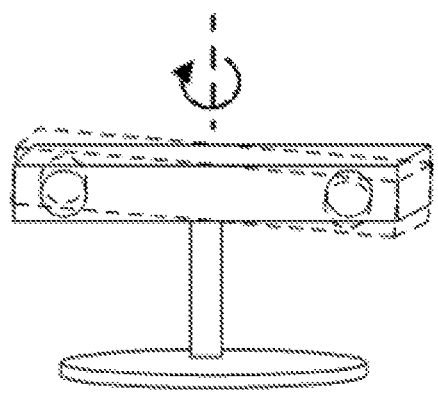
FIG. 3 is a schematic view of the apparatus for extending binocular camera positioning range according to an embodiment of the present disclosure controlling the binocular camera to rotate clockwise around a vertical axis.
Figure 4:
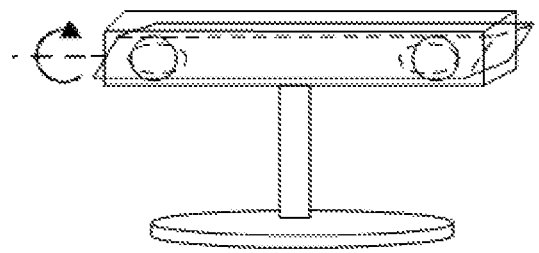
FIG. 4 is a schematic view of the apparatus for extending binocular camera positioning range according to an embodiment of the present disclosure controlling the binocular camera to rotate clockwise around a horizontal axis.
Figure 5:
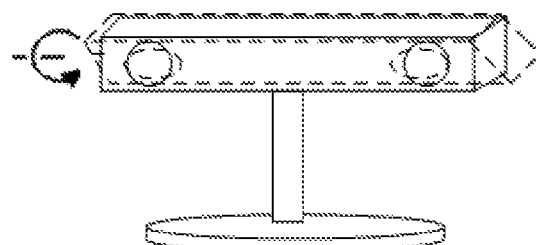
FIG. 5 is a schematic view of the apparatus for extending binocular camera positioning range according to an embodiment of the present disclosure controlling the binocular camera to rotate counterclockwise around a horizontal axis.

The effect resulting from the vertical motor and the horizontal motor controlling the rotatable base 110 to drive the lens of the binocular camera to rotate is as shown in FIG. 2 to FIG. 5. When the judging module 130 determines that the target to be positioned will go out of the field of vision of the binocular camera soon from the right, the controlling module 140 controls the vertical motor to rotate counterclockwise in the vertical direction and thereby control the rotatable base 110 to drive the lens of the binocular camera to rotate counterclockwise around the vertical axis as shown in FIG. 2. When the judging module 130 determines that the target to be positioned will go out of the field of vision of the binocular camera soon from the left, the controlling module 140 controls the vertical motor to rotate clockwise in the vertical direction and thereby control the rotatable base 110 to drive the lens of the binocular camera to rotate clockwise around the vertical axis as shown in FIG. 3. Similarly, when the judging module 130 determines that the target to be positioned will go out of the field of vision of the binocular camera soon from above, the controlling module 140 controls the horizontal motor to rotate clockwise in the horizontal direction and thereby control the rotatable base 110 to drive the lens of the binocular camera to rotate clockwise around the horizontal axis as shown in FIG. 4. When the judging module 130 determines that the target to be positioned will go out of the field of vision of the binocular camera soon from below, the controlling module 140 controls the horizontal motor to rotate counterclockwise in the horizontal direction and thereby control the rotatable base 110 to drive the lens of the binocular camera to rotate counterclockwise around the horizontal axis as shown in FIG. 5.

Preferably, the angle of rotation each time of the lens of the binocular camera is controlled, so that after the binocular camera rotates each time, the target to be positioned is at the central position of the field of vision of the binocular camera after rotation, so that the target to be positioned obtains a larger movement space and is not apt to go out of the field of vision of the binocular camera again, and the frequent rotation of the lens of the binocular camera is avoided.

To obtain spatial coordinates of the target to be positioned in the field of vision of the binocular camera, it is necessary to build a spatial coordinate system on the basis of the field of vision of the binocular camera. After the binocular camera rotates horizontally or vertically, the direction of the lens changes, and the original spatial coordinate system also changes accordingly. For example, when the lens of the binocular camera rotates around the vertical axis to the left by an angle $\theta$, the x axis and they axis of the original spatial coordinate system also rotate to the left by the angle $\theta$ accordingly, whereas the direction of the z axis does not change.

In some virtual reality applications, the coordinates of the real space are in one-to-one correspondence relationship with the coordinates of the virtual space. In the case that the direction of the spatial coordinate system changes, the coordinates of the points in the real space change accordingly. The same point in the real space has two different coordinates before and after the direction of the lens of the binocular camera rotates. If still followed is the original correspondence relationship, the point corresponds to two different positions of the virtual space before and after the direction of the lens of the binocular camera rotates. For example, before and after the direction of the lens of the binocular camera rotates, the position of the user's left hand does not change. However, since the rotation of the lens causes the real spatial coordinates of the left hand to change, the position of the virtual palm displayed in the virtual space corresponding to the user's left hand changes, and that destroys the continuity of the user experiencing the virtual reality scenes. Hence, after the lens of the binocular camera rotates, it is necessary to implement conversion of the spatial coordinate system according to the rotation direction and angle, and adaptively modify the correspondence relationship between the coordinates of the real space and the coordinates of the virtual space, so that before and after the direction of the lens of the binocular camera rotates, the points in the real space correspond to the same points in the virtual space such that the user's feeling of experiencing the virtual scenes is continuous.

Figure 6:
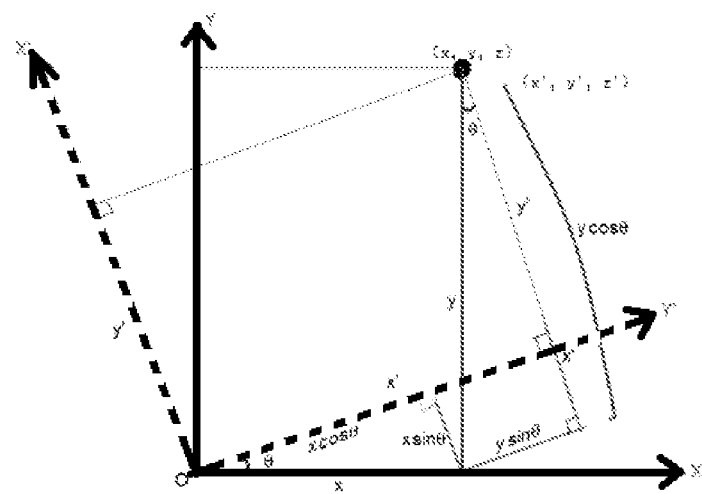
FIG. 6 is a schematic view of coordinate system conversion after the apparatus for extending binocular camera positioning range according to an embodiment of the present disclosure rotates horizontally by a certain angle.

FIG. 6 is a schematic view of coordinate system conversion after the apparatus for extending binocular camera positioning range according to an embodiment of the present disclosure rotates horizontally by a certain angle. As shown in FIG. 6, it is assumed that the binocular camera horizontally rotates at the original point of the spatial coordinate system exactly by an angle $\theta$. Regarding a point (x, y, z), the coordinate of the point after rotation becomes (x', y', z'), wherein $x'=x \cos \theta + y \sin \theta$, $y'=y \cos \theta - x \sin \theta$, and $z'=z$. If originally the point (x', y', z') in the real space corresponds to the point $(x_0, y_0, z_0)$ in the virtual space, now it may be implemented that the points in the real space correspond to the same points in the virtual space before and after the direction of the lens of the binocular camera rotates such that the user's feeling of experiencing the virtual scenes is continuous so long as the correspondence relationship is changed into the correspondence between the point (x', y', z') in the real space and the point $(x_0, y_0, z_0)$ in the virtual space.

After the lens of the binocular camera rotates, it is possible that not only the directions of the coordinate axes rotate, but also the origin of the coordinates translates. In that case, it is also necessary to obtain the translation vector of the spatial coordinate system. On the basis of the above solution, the correspondence relationship between the coordinates of the real space and the coordinates of the virtual space is further modified according to the translation vector. The method is the same and will not be detailed.

Figure 7:
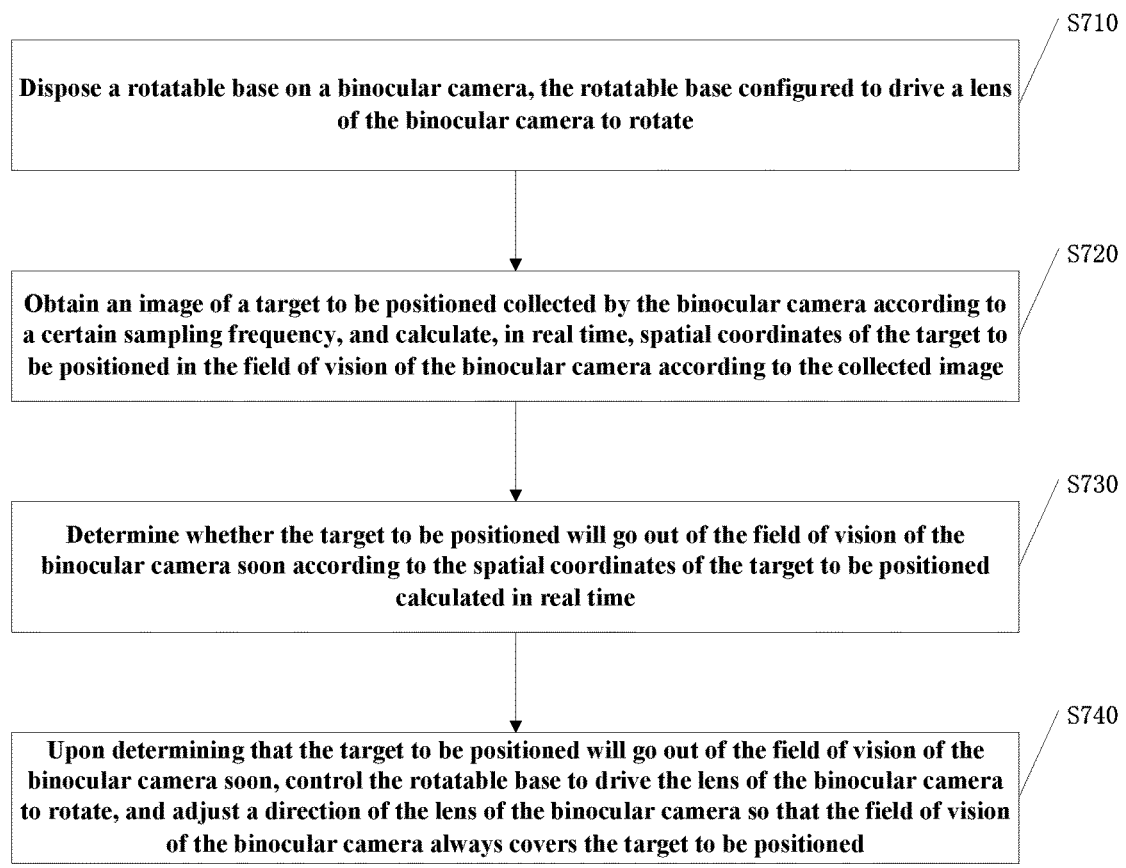
FIG. 7 is a flow chart of a method for extending binocular camera positioning range according to an embodiment of the present disclosure.

FIG. 7 is a flow chart of a method for extending binocular camera positioning range according to an embodiment of the present disclosure. As shown in FIG. 7, the method for extending binocular camera positioning range according to an embodiment of the present disclosure comprises:

Step S710: disposing a rotatable base on a binocular camera, the rotatable base configured to drive a lens of the binocular camera to rotate.

Step S720: obtaining an image of a target to be positioned collected by the binocular camera according to a certain sampling frequency, and calculating, in real time, spatial coordinates of the target to be positioned in the field of vision of the binocular camera according to the collected image.

Step S730: judging whether the target to be positioned will go out of the field of vision of the binocular camera soon according to the spatial coordinates of the target to be positioned calculated in real time.

Step S740: upon determining that the target to be positioned will go out of the field of vision of the binocular camera soon, controlling the rotatable base to drive the lens of the binocular camera to rotate, and adjusting a direction of the lens of the binocular camera so that the field of vision of the binocular camera always covers the target to be positioned, whereby the positioning range of the binocular camera is extended without changing the original FOV of the binocular camera, and the positioning precision will not be harmed.

To determine whether the target to be positioned will go out of the field of vision of the binocular camera soon, preferred embodiments of the present disclosure provide the following two preferred embodiments. The solutions of the two preferred embodiments may be used in combination.

In a preferred embodiment of the present disclosure, the "judging whether the target to be positioned will go out of the field of vision of the binocular camera soon according to the spatial coordinates of the target to be positioned calculated in real time" in step S730 includes:

determining that the target to be positioned will go out of the field of vision of the binocular camera soon when the nearest distance, as calculated in real time, between spatial coordinates of the target to be positioned in the field of vision of the binocular camera and an edge of the field of vision of the binocular camera is less than a preset distance.

In another preferred embodiment of the present disclosure, the "judging whether the target to be positioned will go out of the field of vision of the binocular camera soon according to the spatial coordinates of the target to be positioned calculated in real time" in step S730 includes:

calculating a movement speed of the target to be positioned at the current moment according to spatial coordinates of several targets to be positioned nearest to the current moment and the sampling frequency of the binocular camera;

according to the movement speed and spatial coordinates of the target to be positioned at the current moment, estimating a time period that the target to be positioned spends moving at the movement speed to the edge of the field of vision of the binocular camera; and determining that the target to be positioned will go out of the field of vision of the binocular camera soon when the estimated time period is smaller than a preset time period.

Preferably, the method for extending binocular camera positioning range according to an embodiment of the present disclosure further comprises:

connecting a vertical motor and a horizontal motor individually with the rotatable base; the vertical motor is capable of rotate in the vertical direction and configured to control the rotatable base to drive the lens of the binocular camera to rotate around a vertical axis; and the horizontal motor is capable of rotate in the horizontal direction and configured to control the rotatable base to drive the lens of the binocular camera to rotate around a horizontal axis.

Further preferably, the "upon determining that the target to be positioned will go out of the field of vision of the binocular camera soon, controlling the rotatable base to drive the lens of the binocular camera to rotate, and adjusting a direction of the lens of the binocular camera so that the field of vision of the binocular camera always covers the target to be positioned" in step S740 specifically comprises:

upon determining that the target to be positioned will go out of the field of vision of the binocular camera soon from the left or right, controlling the vertical motor to rotate in the vertical direction and thereby controlling the rotatable base to drive the lens of the binocular camera to rotate clockwise or counterclockwise around the vertical axis, so that the target to be positioned is at a center of the field of vision in the horizontal direction after the lens of the binocular camera rotates; and upon determining that the target to be positioned will go out of the field of vision of the binocular camera soon from above or below, controlling the horizontal motor to rotate in the horizontal direction and thereby controlling the rotatable base to drive the lens of the binocular camera to rotate clockwise or counterclockwise around the horizontal axis, so that the target to be positioned is at a center of the field of vision in the vertical direction after the lens of the binocular camera rotates, so that the target to be positioned obtains a larger movement space and is not apt to go out of the field of vision again, and the frequent rotation of the lens of the binocular camera is avoided.

After the lens of the binocular camera rotates, it is possible to according to practical needs implement conversion of the spatial coordinate system according to the rotation direction and angle of the lens of the binocular camera, and adaptively modify the correspondence relationship between the coordinates of the real space and the coordinates of the virtual space, so that before and after the direction of the lens of the binocular camera rotates, the points in the real space correspond to the same points in the virtual space such that the user's feeling of experiencing the virtual scenes is continuous.

To conclude, as compared with the prior art, the method and apparatus for extending binocular camera positioning range according to the present disclosure has the following advantageous effects:

1. By disposing the rotatable base on the binocular camera, when the target to be positioned will go out of the field of vision of the binocular camera soon, the rotatable base drives the lens of the binocular camera to rotate and adjusts the direction of the lens of the binocular camera so that the field of vision of the binocular camera always covers the target to be positioned, and so that the extension of the binocular camera positioning range is realized without increasing the FOV of the binocular camera and without losing positioning precision.
2. Upon determining that the target to be positioned will go out of the field of vision of the binocular camera soon, the lens of the binocular camera is controlled to perform horizontal rotation and/or vertical rotation, so that the target to be positioned is at a central position of the field of vision after rotation, so that the target to be positioned obtains a larger movement space and is not apt to go out of the field of vision again, and the frequent rotation of the lens of the binocular camera is avoided.

What are described above are only preferred embodiments of the present disclosure and not intended to limit the protection scope of the present disclosure. Any modifications, equivalent substitutions and improvements made within the spirit and principle of the present disclosure are all included in the protection scope of the present disclosure.

It should be explained that:

The embodiments of the components of the present disclosure can be implemented as hardware, as a software module executed on one or more processors, or as their combination. A person skilled in the art should understand that, microprocessors or digital signal processors (DSP) can be employed in practice to implement some or all of the functions of some or all of the components according to the embodiments of the present disclosure. The present disclosure can also be implemented as devices or device programs for executing some or all of the method described herein (for example, computer programs and computer program products). Such programs for implementing the present disclosure can be stored in computer readable media, or can be in the form of one or more signals. Such signals can be obtained by being downloaded from internet websites, or be provided by carrier signals, or be provided in any other forms.

The apparatus for extending binocular camera positioning range of the present disclosure traditionally comprises a processor and a computer program product or a computer readable medium in the form of memory. The memory can be an electronic memory such as a flash memory, an EEPROM, an EPROM, a hard disk or a ROM and the like. The memory has a storage space for executing the program code of any method step of the above method. For example, the storage space for the program code can comprise each of the program codes for individually implementing the steps of the above method. These program codes can be read out or written in from one or more computer program products to the one or more computer program products. The computer program products comprise program code carriers such as hard disk, compact disk (CD), memory card or floppy disk and the like. Such computer program products are generally portable or fixed storage units. The storage units can be similarly disposed memory segments, storage spaces or the like. The program code can for example be compressed in appropriate forms. Generally, the storage units comprise computer readable codes for executing the method steps according to the present disclosure, that is, codes that can be read by for example processors, and when the codes are executed, the apparatus for extending binocular camera positioning range executes each of the steps of the method described above.

It should be noted that, the above embodiments are intended to illustrate the present disclosure, rather than limiting the present disclosure, and a person skilled in the art can design alternative embodiments without departing from the scope of the attached claims. The word "comprise" does not exclude the elements or steps that are not listed in the claims. The present disclosure can be implemented by means of hardware that comprise numbers of different elements and by means of computers that are properly programmed. In claims that list numbers of units of devices, some of these devices can be embodied via the same hardware item.

The description provided herein illustrates many concrete details. However, it can be understood that, the embodiments of the present disclosure can be implemented without the concrete details. In some embodiments, well known methods, structures and techniques are not described in detail, so as not to obscure the understanding of the description. The languages used in the description are chosen mainly for sake of readability and teaching, and are not chosen to interpret or define the subject matter of the present disclosure.

What is claimed is:

1. An apparatus for extending binocular camera positioning range, comprising:
    a rotatable base, a positioning module, a judging module, and a controlling module;
    the rotatable base is disposed on the binocular camera and configured to drive a lens of the binocular camera to rotate;
    the positioning module is configured to obtain an image of a target to be positioned, and calculate, in real time, spatial coordinates of the target to be positioned in a field of vision of the binocular camera according to the image that is collected by the binocular camera according to a sampling frequency;
    the judging module is configured to, according to the spatial coordinates of the target to be positioned calculated in real time, determine whether the target to be positioned will go out of the field of vision of the binocular camera soon; and
    the controlling module is configured to, when the judging module determines that the target to be positioned will go out of the field of vision of the binocular camera soon, control the rotatable base to drive the lens of the binocular camera to rotate, and adjust a direction of the lens of the binocular camera so that the field of vision of the binocular camera always covers the target to be positioned;
    wherein the judging module uses the following two solutions in combination to determine whether the target to be positioned will go out of the field of vision of the binocular camera soon:
    solution one: a certain area is pre-demarcated in the field of vision of the binocular camera, and when the binocular camera positions that the target to be positioned goes out of the pre-demarcated area, it is judged as going out of the field of vision soon; and
    solution two: a movement speed and a movement trajectory of the target to be positioned is obtained according to collected spatial coordinates of the target to be positioned, the movement state of the target to be positioned is predicted based on the movement speed and the movement trajectory, and if it is predicted that the target to be positioned will go out of the field of vision of the binocular camera in a short time period in the movement state, it is judged as going out of the field of vision soon.

2. The apparatus according to claim 1, wherein the judging module is configured to:
    determine that the target to be positioned will go out of the field of vision of the binocular camera soon when the nearest distance, as calculated in real time, between spatial coordinates of the target to be positioned in the field of vision of the binocular camera and an edge of the field of vision of the binocular camera is less than a preset distance.

3. The apparatus according to claim 1, wherein the judging module is configured to:
    calculate a movement speed of the target to be positioned at a current moment according to spatial coordinates of several targets to be positioned nearest to the current moment and the sampling frequency of the binocular camera; according to the movement speed and spatial coordinates of the target to be positioned at the current moment, estimate a time period that the target to be positioned spends moving at the movement speed to an edge of the field of vision of the binocular camera; and determine that the target to be positioned will go out of the field of vision of the binocular camera soon when the estimated time period is smaller than a preset time period.

4. The apparatus according to claim 1, wherein the apparatus further comprises a vertical motor and a horizontal motor individually connected with the rotatable base;
    the vertical motor is capable of rotate in a vertical direction and configured to control the rotatable base to drive the lens of the binocular camera to rotate around a vertical axis; and
    the horizontal motor is capable of rotate in a horizontal direction and configured to control the rotatable base to drive the lens of the binocular camera to rotate around a horizontal axis.

5. The apparatus according to claim 4, wherein the controlling module is configured to:
    when the judging module determines that the target to be positioned will go out of the field of vision of the binocular camera soon from the left or right, control the vertical motor to rotate in the vertical direction and thereby control the rotatable base to drive the lens of the binocular camera to rotate to the left or to the right around a vertical axis so that the target to be positioned is at a center of the field of vision in the horizontal direction after the lens of the binocular camera rotates; and
    when the judging module determines that the target to be positioned will go out of the field of vision of the binocular camera soon from above or below, control the horizontal motor to rotate in the horizontal direction and thereby control the rotatable base to drive the lens of the binocular camera to rotate upward or downward around a horizontal axis, so that the target to be positioned is at a center of the field of vision in the vertical direction after the lens of the binocular camera rotates.

6. A method for extending binocular camera positioning range, wherein the method comprises:
    disposing a rotatable base on a binocular camera, the rotatable base configured to drive a lens of the binocular camera to rotate;
    obtaining an image of a target to be positioned, and calculating, in real time, spatial coordinates of the target to be positioned in a field of vision of the binocular camera according to the image that is collected by the binocular camera according to a sampling frequency;
    determining whether the target to be positioned will go out of the field of vision of the binocular camera soon according to the spatial coordinates of the target to be positioned calculated in real time; and upon determining that the target to be positioned will go out of the field of vision of the binocular camera soon, controlling the rotatable base to drive the lens of the binocular camera to rotate, and adjusting a direction of the lens of the binocular camera so that the field of vision of the binocular camera always covers the target to be positioned;

wherein the following two solutions are used in combination in determining whether the target to be positioned will go out of the field of vision of the binocular camera soon:

solution one: a certain area is pre-demarcated in the field of vision of the binocular camera, and when the binocular camera positions that the target to be positioned goes out of the pre-demarcated area, it is judged as going out of the field of vision soon; and solution two: a movement speed and a movement trajectory of the target to be positioned is obtained according to collected spatial coordinates of the target to be positioned, the movement state of the target to be positioned is predicted based on the movement speed and the movement trajectory, and if it is predicted that the target to be positioned will go out of the field of vision of the binocular camera in a short time period in the movement state, it is judged as going out of the field of vision soon.

7. The method according to claim 6, wherein judging whether the target to be positioned will go out of the field of vision of the binocular camera soon according to the spatial coordinates of the target to be positioned calculated in real time comprises:

determining that the target to be positioned will go out of the field of vision of the binocular camera soon when the nearest distance, as calculated in real time, between spatial coordinates of the target to be positioned in the field of vision of the binocular camera and an edge of the field of vision of the binocular camera is less than a preset distance.

8. The method according to claim 6, wherein judging whether the target to be positioned will go out of the field of vision of the binocular camera soon according to the spatial coordinates of the target to be positioned calculated in real time comprises:

calculating a movement speed of the target to be positioned at a current moment according to spatial coordinates of several targets to be positioned nearest to the current moment and the sampling frequency of the binocular camera; according to the movement speed and spatial coordinates of the target to be positioned at the current moment, estimating a time period that the target to be positioned spends moving at the movement speed to an edge of the field of vision of the binocular camera; and determining that the target to be positioned will go out of the field of vision of the binocular camera soon when the estimated time period is smaller than a preset time period.

9. The method according to claim 6, further comprising:

connecting a vertical motor and a horizontal motor individually with the rotatable base;

the vertical motor is capable of rotate in a vertical direction and configured to control the rotatable base to drive the lens of the binocular camera to rotate around a vertical axis; and the horizontal motor is capable of rotate in a horizontal direction and configured to control the rotatable base to drive the lens of the binocular camera to rotate around a horizontal axis.

10. The method according to claim 9, wherein the upon determining that the target to be positioned will go out of the field of vision of the binocular camera soon, controlling the rotatable base to drive the lens of the binocular camera to rotate, and adjusting a direction of the lens of the binocular camera so that the field of vision of the binocular camera always covers the target to be positioned specifically comprises:

upon determining that the target to be positioned will go out of the field of vision of the binocular camera soon from the left or right, controlling the vertical motor to rotate in the vertical direction and thereby controlling the rotatable base to drive the lens of the binocular camera to rotate to the left or to the right around a vertical axis so that the target to be positioned is at a center of the field of vision in the horizontal direction after the lens of the binocular camera rotates; and upon determining that the target to be positioned will go out of the field of vision of the binocular camera soon from above or below, controlling the horizontal motor to rotate in the horizontal direction and thereby controlling the rotatable base to drive the lens of the binocular camera to rotate upward or downward around a horizontal axis, so that the target to be positioned is at a center of the field of vision in the vertical direction after the lens of the binocular camera rotates.

* * * * *